United States Patent Office 3,033,843

Patented May 8, 1962

3,033,943

PREPARATION OF POLYVINYL ALCOHOL

Harold K. Inskip, Buffalo, and Elbert V. Kring, Tonawanda, N.Y., assignors to E. I. du Pont de Nemours and Company, Wilmington, Del., a corporation of Delaware No Drawing. Filed Jan. 6, 1958, Ser. No. 707,100
11 Claims. (Cl. 260—91.3)

This invention relates to polyvinyl alcohol and more particularly to the alkali-catalyzed alcoholysis of polyvinyl esters to produce polyvinyl alcohol of improved color and with reduced degradation due to peroxygen compounds present during the alcoholysis.

Polyvinyl alcohols prepared by reaction of polyvinyl esters with hydrolytic alcohols in the presence of an alkaline catalyst tend to be colored both as the solid and in aqueous solution. For some applications, such as films or as an intermediate in the preparation of polyvinyl butyral which is used in laminated safety glass, the color is a disadvantage. Acid-catalyzed alcoholysis of polyvinyl esters generally gives polyvinyl alcohol of improved color but is much slower and more costly to operate than the alkali-catalyzed alcoholysis. A need therefore exists for a new procedure to permit the use of the faster alkali-catalyzed alcoholysis of polyvinyl esters to produce polyvinyl alcohol of improved color.

The polyvinyl esters used in the alkali-catalyzed alcoholysis to polyvinyl alcohol are most often prepared by organic peroxide-initiated polymerization of monomeric vinyl esters. Unless the peroxide is completely removed or destroyed prior to alcoholysis, degradation of the polyvinyl alcohol occurs as is evidenced by a reduction in the viscosity of aqueous solutions of the polyvinyl alcohol. Moreover, while it is known that hydrogen peroxide is a very effective polymerization inhibitor and can be used to stop the polymerization of the vinyl ester at the desired conversion and to prevent further polymerization during the removal of the monomer from the polymerized vinyl ester, when hydrogen peroxide is so used, any peroxide remaining in the polyvinyl ester during the alcoholysis causes excessive degradation of the polyvinyl alcohol. Attempts to remove the hydrogen peroxide from the polymer prior to alcoholysis have been either very expensive or have introduced undesirable foreign material into the finished product. There is, therefore, a need for a process for the alkali-catalyzed alcoholysis of polyvinyl esters which will prevent the degradation of the polyvinyl alcohol by peroxygen compounds which may be present.

It is an object of this invention to provide a process for the alkali-catalyzed alcoholysis of polyvinyl esters to polyvinyl alcohol of improved color. Another object is to effect the alkali-catalyzed alcoholysis of polyvinyl esters to polyvinyl alcohol of improved color without contamination by inorganic salts. A further objective is the preparation of polyvinyl alcohol by the alkali-catalyzed alcoholysis of polyvinyl esters without degradation by peroxygen compounds present in the polyvinyl ester. A still further objective is to prepare polyvinyl alcohol of improved color and without oxidative degradation by the alcoholysis of polyvinyl acetate in the presence of an alkaline catalyst. A still further objective is the preparation of polyvinyl alcohol by the alkali-catalyzed alcoholysis of polyvinyl acetate containing hydrogen peroxide. Other objects will be apparent as the invention is further described.

These and other objects of this invention are accomplished by conducting the alkali-catalyzed alcoholysis of polyvinyl esters in the presence of, that is, in admixture with formaldehyde or a compound which gives formaldehyde under the alkaline reaction conditions of the alcoholysis. The formaldehyde may be added to the polyvinyl ester solution prior to alcoholysis, to the alkaline catalysts prior to alcoholysis, or it may be added simultaneously with the polyvinyl ester solution to the alcoholysis mixture. The formaldehyde not only reduces the color of the derived polyvinyl alcohol but also eliminates or minimizes the degradation of the polyvinyl alcohol by the organic and inorganic peroxygen compounds which may be present.

The invention is illustrated by the following examples.

*Example 1*

A 3-liter reaction vessel was fitted with an agitator, reflux condenser, and addition tube. In it were placed about 400 ml. of methanol and 45 ml. of a 10% solution of sodium methylate in methanol. The temperature of this solution was maintained at 57° C. by heating the reaction vessel in a water bath. A 35% solution of polyvinyl acetate in methanol was added at 10 ml./minute to the solution in the reaction vessel with constant stirring. The polyvinyl acetate was a grade which upon substantially complete alcoholysis (99–100%) gave a polyvinyl alcohol whose 4% aqueous solution viscosity was 28–32 centipoises at 20° C. The alkalinity was checked periodically and additional 10% sodium methylate in methanol added to maintain 0.30% based on the mixture. After addition of 300 g. of the polymer solution was complete, heating was continued for about one hour. The resulting slurry of polyvinyl alcohol was neutralized to pH 7 with acetic acid. The polyvinyl alcohol was collected on a filter, washed with methanol and dried under vacuum at 60° C. Aqueous 4% solutions of the dried polyvinyl alcohol were made with distilled water adjusted to pH 2.0 with sulfuric acid and heated three hours at 96° C. and then cooled. The transmission of light through a uniform section of the solution was measured at three wave lengths, 450 mμ, 560 mμ and 640 mμ in a Coleman Junior spectrophotometer, model 6B. The percent yellow was calculated using the formula:

$$\text{Percent yellow} = \frac{(T450 - T640)}{T560} \times 100$$

where T is the transmission at the indicated wave length.

This experiment was repeated four times with the same polyvinyl acetate but adding 0.1%, 0.5%, 2.% and 4.0% paraformaldehyde based on polyvinyl acetate to the polymer solution. The polymer solutions were alcoholized using the same conditions and the resulting polyvinyl alcohol processed in the same way. The following table shows the effect of paraformaldehyde on polyvinyl alcohol color.

| | | | | | |
|---|---|---|---|---|---|
| Percent Paraformaldehyde based on Polyvinyl Acetate | 0 | 0.1 | 0.5 | 2.0 | 4.0 |
| Aqueous Polyvinyl Alcohol Solution, Percent Yellow | 2.7 | 2.0 | 1.8 | 2.2 | 2.3 |

The data indicate the color reduction obtained with 0.1 to 4% paraformaldehyde based on the polyvinyl acetate. While color reduction is obtained throughout the range of paraformaldehyde concentration, the results indicate that for the particular polyvinyl acetate solution employed, the optimum concentration tested was 0.5%. Use of 2% or more paraformaldehyde was not as effective and the results indicate that the benefit was being overcome by color possibly caused by excess paraformaldehyde.

*Example 2*

Two 3-liter reaction vessels, with side arms placed on the flasks to allow overflow after the volume of the contents reached 1800 ml., were set up in series followed by a smaller vessel of 500 ml. capacity with a side arm set to allow overflow after 100 ml., and a 3-liter vessel for a receiver. Each of the first three vessels was equipped with a condenser, an agitator and thermometer. The first vessel was also equipped with two graduated delivery tubes to introduce polyvinyl acetate solution and sodium methylate solution. To the first vessel were added 1750 ml. of methanol and 50 ml. of 10% sodium methylate solution. To the second vessel were added 320 ml. of methanol and 7 ml. of 10% sodium methylate. The third vessel had no heel. The vessels were heated electrically and brought to 45° C. for the first vessel and 57° C. for the second and third vessels. After the temperature was reached in the first vessel, a 35% solids, methanol solution of the same grade of polyvinyl acetate as in Example 1 was added at the rate of 10 ml./minute. At the same time, 10% sodium methylate solution was added as required to maintain an alkalinity of 0.30% in the first vessel. The polyvinyl alcohol-methanol slurry was allowed to overflow into the second and third vessels and finally collected under methanol in the receiver. The entire run took from 12–15 hours to reach 17.5% solids in the first three vessels. Product polyvinyl alcohol collected in the receiver after this period was considered representative of the entire run at these solids. The polyvinyl alcohol slurry from the receiver was neutralized with acetic acid to pH 7, collected on a filter, washed with methanol and dried under reduced pressure at 60° C. Aqueous 4% solutions of the polyvinyl alcohol gave colors of 3.6% yellow.

In a similar continuous alcoholysis with temperatures of 45°, 57°, and 57° C. in first, second, and third vessels, respectively, addition of 2.6% paraformaldehyde based on polyvinyl acetate to the polyvinyl acetate solution resulted in polyvinyl alcohol which gave an aqueous solution color of 2.9% yellow.

*Example 3*

In a similar continuous alcoholysis with the same polyvinyl acetate solution, but no additive, the temperature of the first vessel was increased to 57° C. while the temperature of the second and third vessels was maintained at 57° C. The polyvinyl alcohol was processed as before. Aqueous 4% solutions of the polyvinyl alcohol gave an average color of 4.7% yellow.

Addition of 2.6% paraformaldehyde based on polyvinyl acetate to the polyvinyl acetate solution and subsequent alcoholysis at 57° C. for the three vessels resulted in polyvinyl alcohol whose 4% aqueous solution color was 3.4% yellow.

*Example 4*

In another continuous alcoholysis with the same polyvinyl acetate solution and with a temperature of 57° C. in the three vessels, the 10% sodium methylate catalyst solution was modified prior to use by adding 13 grams of paraformaldehyde to 600 ml. of the solution (total amount used in the alcoholysis of 1000 g. of polyvinyl acetate). This amounts to 1.3% paraformaldehyde based on polyvinyl acetate. The polyvinyl alcohol obtained was treated as before. Aqueous 4% solutions of the polyvinyl alcohol averaged 2.6% yellow.

*Example 5*

To 100 g. of a refluxing methanol solution of 1.0 g. of sodium methylate were added 100 g. of 30% polyvinyl acetate solution in methanol over a period of 60 minutes. The polyvinyl alcohol slurry obtained was heated at reflux for an additional hour and then sufficient glacial acetic acid was added to neutralize the sodium methylate. The polyvinyl alcohol was filtered, washed with methanol and dried at 60° to 80° C. A 4% aqueous solution of the polyvinyl alcohol had a viscosity (Hoeppler falling ball viscometer) of 60 centipoises at 20° C. and a color of 14.0% yellow. The saponification number of the polyvinyl alcohol was 6.0.

*Example 6*

Example 5 was repeated except that 1.0 g. of 35% hydrogen peroxide was added to the polymer solution prior to the alcoholysis and 4.0 g. of sodium methylate were used in place of 1.0 g. The additional 3.0 g. of sodium methylate were required to react with the water added with the hydrogen peroxide and that formed in its decomposition. The 4% aqueous solution of the polyvinyl alcohol had a viscosity of 30 centipoises at 20° C. and a color of 8.0% yellow. The saponification number of the polyvinyl alcohol was 6.5.

*Example 7*

Example 6 was repeated except that 0.8 g. of paraformaldehyde was added to the polymer solution prior to the alcoholysis. The 4% aqueous polyvinyl alcohol solution had a viscosity of 61 centipoises and a color of 5.2% yellow. The saponification number of the polyvinyl alcohol was 5.8.

*Example 8*

Example 7 was repeated except that 2.0 ml. of 37% aqueous formaldehyde solution and 8.0 g. of sodium methylate were added in place of 0.8 g. paraformaldehyde and 4.0 g. of sodium methylate, respectively. The 4% aqueous polyvinyl alcohol solution had a viscosity of 60 centipoises and a color of 6.2% yellow. The saponification number of the polyvinyl alcohol was 8.0.

The saponification numbers of the polyvinyl alcohol obtained in Examples 5–8 indicate that in each alcoholysis more than 99% of the acetate groups were replaced by hydroxyl groups.

Examples 5–8 indicate the effectiveness of formaldehyde in eliminating the degradation of polyvinyl alcohol by hydrogen peroxide when present during the alkali-catalyzed alcoholysis of polyvinyl acetate. The Examples also indicate an improvement in solution color when hydrogen peroxide is present during the alcoholysis and a further improvement in solution color when formaldehyde is present during the alcoholysis.

The process of this invention is applicable to batch or continuous alkali-catalyzed alcoholysis of a polyvinyl ester of a carboxylic acid to produce polyvinyl alcohol. Polyvinyl alcohol includes the products obtained by the complete or partial replacement of the ester groups of the polymerized vinyl ester by hydroxyl groups. These products are available commercially and are known as completely hydrolyzed and partially hydrolyzed polyvinyl alcohols. Our invention is applicable to the preparation of alcoholysis products containing from 0 to 50% or more of the ester groups of the original polyvinyl ester.

Polyvinyl esters of organic mono-carboxylic acids can be used and the preferred materials are the polymerized vinyl esters of aliphatic mono-carboxylic acids containing 1 to 4 carbon atoms. The most often used and the preferred polyvinyl ester of this group is polyvinyl acetate. The polyvinyl ester is used in the form of a solution, usually in the hydrolytic alcohol used in the alcoholysis. Other solvents for the polyvinyl ester may be used provided that they are stable under the alkaline conditions of alcoholysis and that sufficient hydrolytic alcohol is present to give the desired extent of alcoholysis.

This invention is limited to the alkali-catalyzed reaction of polyvinyl esters with hydrolytic alcohols in the presence of formaldehyde or a compound which gives formaldehyde under alkaline conditions. Formaldehyde cannot be used in acid-catalyzed alcoholysis of polyvinyl esters to polyvinyl alcohol because it reacts with polyvinyl alcohol under acid conditions to form polyvinyl formal. The alkaline catalysts which may be used include alkali metal alcoholates and hydroxides and quaternary ammonium bases. Alkali metal alcoholates are preferred over the alkali metal hydroxides particularly when the alcoholysis is carried out by a continuous process as in Examples 2–4 and when an elevated temperature of above 35° C. is used. The preferred catalyst is the sodium alcoholate of the hydrolytic alcohol used.

Hydrolytic alcohols consist of those alcohols which react with polyvinyl esters in the presence of an alkaline catalyst to produce polyvinyl alcohol and the ester of the hydrolytic alcohol. The most effective hydrolytic alcohols are methanol, ethanol and the monoethyl ether of ethylene glycol. Other hydrolytic alcohols such as n-propyl alcohol, isopropyl alcohol, n-butyl alcohol and isobutyl alcohol can be used but are not as satisfactory because of the slow rate of reaction with the polyvinyl ester. The preferred hydrolytic alcohol is methanol and the preferred catalyst is sodium methylate because of cost and rapid reaction. The reaction of an ester with a hydrolytic alcohol in the presence of a catalyst to produce the alcohol corresponding to the ester, such as the reaction of polyvinyl ester with an alcohol to produce polyvinyl alcohol, is known as alcoholysis, and when the hydrolytic alcohol is methanol, the reaction is known as methanolysis.

Alcoholyses catalyzed by alkali metal alcoholates are carried out under substantially anhydrous conditions since any water present reacts with the alkali metal alcoholate to form the alcohol and the alkali metal hydroxide. While the alkali metal hydroxides may be used as catalysts, they generally require the use of temperatures below about 30° C. to minimize saponification of the polyvinyl ester. Any saponification which occurs removes an equivalent amount of alkali metal hydroxide by formation of the alkali metal salt of the acid corresponding to the ester. The presence of water during the alkali metal hydroxide catalyzed alcoholysis increases the amount of saponification of the polyvinyl ester and also the by-product ester formed in the alcoholysis. Saponification is undesirable because it not only destroys the catalyst but increases the amount of foreign material in the product polyvinyl alcohol unless special care is taken to wash the polyvinyl alcohol thoroughly.

The presence of formaldehyde during the alcoholysis is required for our process. The formaldehyde may be added in the form of an aqueous or alcohol solution of formaldehyde. Since the water in the aqueous solution reacts with alkali metal alcoholates and tends to increase the saponification of the ester, the aqueous solution is usually not preferred. Alcohol solutions of formaldehyde are very convenient to use, especially when the alcohol is the same as the hydrolytic alcohol. The formaldehyde apparently exists in solution chiefly as the simple hemiacetal; thus, formaldehyde in methanol exists as the hemiacetal, $CH_3OCH_2OH$. The formaldehyde may also be added as a polymer of the polyoxymethylene glycol type. The commercial paraformaldehyde is a mixture of polyoxymethylene glycols containing from about 6 to 100 formaldehyde units per molecule and is very useful in our invention. The paraformaldehyde may be added to the alcoholysis mixture as a solid or it may be dispersed in the polyvinyl ester solution or catalyst solution prior to the addition of the alcoholysis vessel. Bisulfite addition compounds of formaldehyde may also be used as the source of formaldehyde. Thus, sodium formaldehyde bisulfite is soluble in methanol and yields formaldehyde under the alkaline alcoholysis conditions. However, if it is desired to avoid contamination of the product polyvinyl alcohol by inorganic salts, it is preferred not to use bisulfite addition compounds.

The amount of formaldehyde or formaldehyde-producing compound which is used depends on the amount of color-producing impurities such as acetaldehyde which may be present in the polyvinyl ester. A small amount of acetaldehyde is usually present in the polyvinyl ester or it may be formed during the alcoholysis by reaction of residual monomeric vinyl ester with the hydrolytic alcohol in the presence of the alkaline catalyst. Usually from about 0.1 to 4% formaldehyde based on the polyvinyl ester is sufficient. Too large an excess of formaldehyde should be avoided since the excess may form colored bodies by auto-condensation in the presence of the alkaline catalyst and overcome the beneficial effect of the formaldehyde.

The amount of formaldehyde used to prevent or minimize degradation of the polyvinyl alcohol by peroxygen compounds present in polyvinyl ester depends on the peroxygen content. A minimum of two moles of formaldehyde or formaldehyde equivalent, when formaldehyde-yielding substances such as polyoxymethylene glycols or formaldehyde hemiacetals are used, is required for each mole of peroxygen compound present in the polyvinyl ester. The peroxygen compound in the polyvinyl ester may be residual initiator used in the polymerization of the vinyl ester. Among the initiators which may be used are benzoyl peroxide, acetyl peroxide and other acyl peroxides. Hydrogen peroxide may be present from its use as a polymerization inhibitor as disclosed in U.S. Patent 2,662,878. The amount of peroxygen compound used as initiator in the polymerization of vinyl esters is usually less than about 0.5% based on the monomeric ester and the amount of hydrogen peroxide inhibitor is usually less than about 0.5% based on the polymerized vinyl ester. Since the peroxygen compounds decompose during their use, the residual concentration in the polyvinyl ester is considerably less than the total used as initiator and inhibitor. The amount of formaldehyde required, therefore, usually falls within the range of up to 4% based on the polyvinyl ester previously noted as generally sufficient to inhibit color formation. A larger amount may be required in case the amounts of color-producing impurities and peroxygen compounds are unusually high.

Formaldehyde is most effective for reducing the color and preventing the degradation of the polyvinyl alcohol when the alcoholysis is carried out at an elevated temperature. Some benefits are obtained at temperatures of 35° C. and lower but it is generally preferred to operate at temperatures above 40° C. With methanol as the hydrolytic alcohol, the preferred temperature is from about 40° C. to about 60° C.

Formaldehyde is the only saturated aliphatic aldehyde which can be used in our process. Indeed, addition of acetaldehyde, the next higher homolog, to the alcoholysis increases the color of the polyvinyl alcohol. Reducing agents such as sulfur dioxide, sodium bisulfite or sodium hydrosulfite do not prevent the degradation of polyvinyl alcohol by peroxygen compounds. These materials may react with hydrogen peroxide in the presence of water but under the substantially anhydrous alcoholysis conditions, that is, in the presence of less than about 1% water, they do not react or react so slowly that they are ineffective in preventing peroxide degradation of the polyvinyl alcohol which occurs readily even in the absence of water. Formaldehyde prevents degradation even in an anhydrous system.

While addition of sodium bisulfite and sodium hydrosulfite to the alcoholysis may reduce the color of aqueous solutions of the derived polyvinyl alcohol, they have little or no beneficial effect on the color of the polyvinyl alcohol powder obtained from the alcoholysis. Formaldehyde gives a reduction in both the powder color and solution color of the polyvinyl alcohol. Moreover since the inorganic sulfites are substantially insoluble in the alcoholysis medium, they remain with the polyvinyl alcohol and thus contaminate it with an inorganic residue. Any excess formaldehyde used remains in solution in the alcoholysis medium and thus is readily removed when the solid polyvinyl alcohol is separated from the alcoholysis medium, for example, by filtration.

The nature of the reaction or reactions by which formaldehyde reduces the color of the polyvinyl alcohol is not definitely known but it is probable that under the alkaline conditions of the alcoholysis at least part of the formaldehyde is converted to the alkali metal formate. The reaction with peroxygen compounds probably also leads to the alkali metal formate. This material, unlike the inorganic sulfites, is sufficiently soluble in the alcoholysis medium that it may be removed during filtration and washing of the polyvinyl alcohol. Moreover, since commercial polyvinyl alcohols usually contain residual sodium acetate, the presence of some residual alkali metal formate does not result in contamination with a dissimilar, inorganic material such as the inorganic sulfites.

We claim:

1. The process for the preparation of polyvinyl alcohol which comprises alcoholizing, with an alkaline catalyst, a polyvinyl ester in admixture with a compound selected from the group consisting of formaldehyde, hemiacetals of formaldehyde, polyoxymethylene glycols, and bisulfite addition compounds of formaldehyde.

2. A process according to claim 1 wherein the polyvinyl ester is polyvinyl acetate.

3. The process for the preparation of polyvinyl alcohol which comprises alcoholizing, with an alkaline catalyst, polyvinyl acetate in admixture with from about 0.1 to 4 percent by weight of said polyvinyl acetate of a compound selected from the group consisting of formaldehyde, hemiacetals of formaldehyde, polyoxymethylene glycols, and bisulfite addition compounds of formaldehyde.

4. The process for the preparation of polyvinyl alcohol which comprises alcoholizing, with sodium methylate as catalyst, polyvinyl acetate in methanol solution at a temperature from about 40° to about 60° C. in admixture with from about 0.1 to 4 percent by weight of said polyvinyl acetate of a compound selected from the group consisting of formaldehyde, hemiacetals of formaldehyde, polyoxymethylene glycols, and bisulfite addition compounds of formaldehyde.

5. A process for the preparation of polyvinyl alcohol which comprises alcoholizing a polyvinyl ester with a hydrolytic alcohol in the presence of an alkaline catalyst and in admixture with a compound selected from the group consisting of formaldehyde, hemiacetals of formaldehyde, polyoxymethylene glycols, and bisulfite addition compounds of formaldehyde.

6. A process for the preparation of polyvinyl alcohol which comprises alcoholizing a polymerized vinyl ester of a saturated aliphatic monocarboxylic acid containing 1 to 4 carbon atoms with a hydrolytic alcohol in the presence of an alkaline catalyst and admixture with a compound selected from the group consisting of formaldehyde, hemiacetals of formaldehyde, polyoxymethylene glycols, and bisulfite addition compounds of formaldehyde.

7. A process according to claim 6 wherein the polymerized vinyl ester is polyvinyl acetate.

8. A process according to claim 7 wherein the hydrolytic alcohol is methanol and the alkaline catalyst is sodium methylate.

9. A process for the preparation of polyvinyl alcohol which comprises alcoholizing polyvinyl acetate with a hydrolytic alcohol in the presence of an alkaline catalyst and in admixture with from about 0.1 to 4 percent by weight of said polyvinyl acetate of a compound selected from the group consisting of formaldehyde, hemiacetals of formaldehyde, polyoxymethylene glycols, and bisulfite addition compounds of formaldehyde.

10. A process according to claim 9 wherein the hydrolytic alcohol is methanol and the alkaline catalyst is sodium methylate.

11. A process according to claim 10 wherein the alcoholysis of the polyvinyl acetate with methanol is effected at a temperature from about 40° to about 60° C.

References Cited in the file of this patent

UNITED STATES PATENTS

| | | |
|---|---|---|
| 2,044,730 | Kuehn et al. | June 16, 1936 |
| 2,109,883 | Herrmann et al. | Mar. 1, 1938 |
| 2,200,437 | Voss et al. | May 14, 1940 |
| 2,642,420 | Kenyon et al. | June 16, 1953 |

FOREIGN PATENTS

| | | |
|---|---|---|
| 465,873 | Great Britain | May 13, 1937 |

UNITED STATES PATENT OFFICE
CERTIFICATE OF CORRECTION

Patent No. 3,033,843 May 8, 1962

Harold K. Inskip et al.

It is hereby certified that error appears in the above numbered patent requiring correction and that the said Letters Patent should read as corrected below.

Column 5, line 60, for "of" read -- to --; column 8, line 7, for "and admixture" read -- and in admixture --.

Signed and sealed this 28th day of August 1962.

(SEAL)
Attest:

ESTON G. JOHNSON
Attesting Officer

DAVID L. LADD
Commissioner of Patents